(12) United States Patent
Cai et al.

(10) Patent No.: US 12,351,253 B2
(45) Date of Patent: Jul. 8, 2025

(54) SYSTEM AND METHOD TO DETECT MALFUNCTION IN AN ELECTRONIC CONTROLLED HYDRAULIC ASSISTANCE STEERING SYSTEM

(71) Applicant: CHINA AUTOMOTIVE SYSTEMS, INC., Wuhan (CN)

(72) Inventors: Haimian Cai, Ann Arbor, MI (US); Yuchen Lin, Troy, MI (US)

(73) Assignee: CHINA AUTOMOTIVE SYSTEMS, INC., Wuhan (CN)

( * ) Notice: Subject to any disclaimer, the term of this patent is extended or adjusted under 35 U.S.C. 154(b) by 294 days.

(21) Appl. No.: 18/118,415

(22) Filed: Mar. 7, 2023

(65) Prior Publication Data
US 2023/0322297 A1 Oct. 12, 2023

Related U.S. Application Data

(60) Provisional application No. 63/322,663, filed on Mar. 23, 2022.

(51) Int. Cl.
*B62D 5/30* (2006.01)
*B62D 15/02* (2006.01)
*G01K 3/00* (2006.01)
*G01L 5/22* (2006.01)
*G07C 5/08* (2006.01)
*B62D 5/14* (2006.01)

(52) U.S. Cl.
CPC ........... *B62D 5/30* (2013.01); *B62D 15/0225* (2013.01); *G01K 3/005* (2013.01); *G01L 5/221* (2013.01); *G07C 5/0808* (2013.01); *G07C 5/0816* (2013.01); *B62D 5/14* (2013.01)

(58) Field of Classification Search
CPC ........ B62D 5/30; B62D 5/14; B62D 15/0225; G01K 3/005; G01L 5/221
See application file for complete search history.

(56) References Cited

U.S. PATENT DOCUMENTS

| | | | | |
|---|---|---|---|---|
| 5,020,617 A | * | 6/1991 | Oshita | B62D 5/049 180/404 |
| 6,065,325 A | * | 5/2000 | Tsai | B21D 43/20 72/17.3 |
| 6,334,502 B1 | * | 1/2002 | Tsujimoto | B62D 5/065 701/41 |
| 11,772,667 B1 | * | 10/2023 | Daly, Jr. | B60W 60/0053 701/29.2 |

(Continued)

*Primary Examiner* — Tan Q Nguyen
(74) *Attorney, Agent, or Firm* — Dickinson Wright PLLC

(57) ABSTRACT

A method for detecting a malfunction in a hydraulic-assisted steering system for a vehicle includes: measuring a steering torque; determining the steering torque exceeding a threshold torque for a predetermined length of time; and generating a malfunction signal in response to the determining the steering torque exceeding the threshold torque for the predetermined length of time. A system for detecting a malfunction in a hydraulic-assisted steering system for a vehicle includes a torque sensor configured to measure a steering torque, and a controller configured to: determine the steering torque exceeding a threshold torque for a predetermined length of time; and generate a malfunction signal in response to determining the steering torque exceeding the threshold torque for the predetermined length of time.

20 Claims, 10 Drawing Sheets

(56) References Cited

U.S. PATENT DOCUMENTS

| | | | | |
|---|---|---|---|---|
| 2004/0148076 A1* | 7/2004 | Kodama | ............... | G01D 5/2497 |
| | | | | 701/41 |
| 2008/0066994 A1* | 3/2008 | Fujita | ................... | B62D 5/0463 |
| | | | | 701/43 |
| 2008/0294313 A1* | 11/2008 | Aoki | .................... | B62D 5/0463 |
| | | | | 701/43 |
| 2013/0006474 A1* | 1/2013 | Pyo | ......................... | B62D 6/00 |
| | | | | 701/41 |
| 2013/0304327 A1* | 11/2013 | Morishita | .............. | B62D 5/049 |
| | | | | 701/43 |
| 2016/0101809 A1* | 4/2016 | Hong | .................... | B62D 5/049 |
| | | | | 701/43 |

* cited by examiner

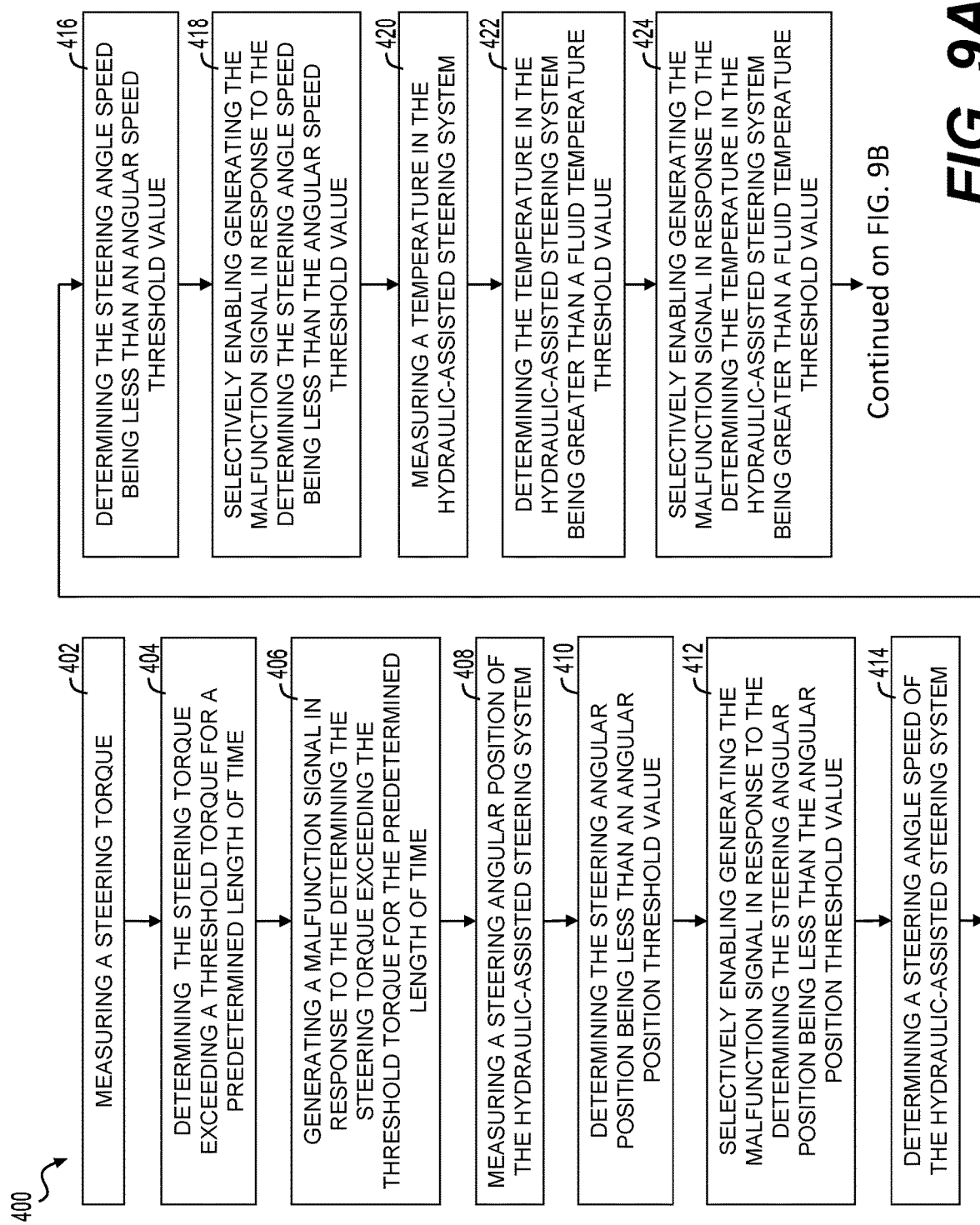

SYSTEM AND METHOD TO DETECT MALFUNCTION IN AN ELECTRONIC CONTROLLED HYDRAULIC ASSISTANCE STEERING SYSTEM

CROSS REFERENCE TO RELATED APPLICATIONS

This U.S. utility patent application claims the benefit of U.S. Provisional Patent Application No. 63/322,663 filed Mar. 23, 2022, the contents of which is incorporated herein by reference in its entirety.

BACKGROUND OF THE INVENTION

1. Field of the Invention

A system and method to detect and characterize a malfunction in an electronically-controlled hydraulic-assistance steering system for a vehicle is provided.

2. Description of the Prior Art

Electronic controlled hydraulic assistance steering system, such as an intelligent hydraulic-assistance recirculating-ball steering gear assembly (iRCB) are widely used in vehicles, such as passenger cars, trucks, and in heavy duty trucks. This steering system's power assistance is mainly from hydraulic power, such as from a hydraulic pump. Malfunctions due to loss of hydraulic pressure, which may result from a pump failure or a hydraulic leak, may compromise the ability of such electronic controlled hydraulic assistance steering system to provide power assistance to aid in steering a vehicle. Detection of such a hydraulic malfunction is, therefore, important. An oil pressure sensor switch may be used to detect a hydraulic malfunction. However, such sensors can add cost and complexity to a steering system.

SUMMARY OF THE INVENTION

The present disclosure provides a method for detecting a malfunction in a hydraulic-assisted steering system for a vehicle. The method comprises: measuring a steering torque; determining the steering torque exceeding a threshold torque for a predetermined length of time; and generating a malfunction signal in response to the determining the steering torque exceeding the threshold torque for the predetermined length of time.

The present disclosure also provides a system for detecting a malfunction in a hydraulic-assisted steering system for a vehicle. The system includes a torque sensor configured to measure a steering torque. The system also includes a controller, which is configured to: determine the steering torque exceeding a threshold torque for a predetermined length of time; and generate a malfunction signal in response to determining the steering torque exceeding the threshold torque for the predetermined length of time.

Advantages of the Invention

The invention, in its broadest aspect, provides a system and method to detect a malfunction in a hydraulic-assisted steering system for a vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIGS. 9A-9B show a flow diagram illustrating steps in method for detecting a malfunction in a hydraulic-assisted steering system for a vehicle, in accordance with the present disclosure.

DESCRIPTION OF THE ENABLING EMBODIMENTS

Referring to the Figures, wherein like numerals indicate corresponding parts throughout the several views, a system and method for detecting a malfunction in a hydraulic-assisted steering system for a vehicle is provided. The system and method of the present disclosure may be implemented in vehicles with electrical steering, such as an electric power steering (EPS) system. The system and method of the present disclosure can improve the steering system and vehicle safety. The system and method of the present disclosure may be implemented, for example, in an electronic controlled hydraulic assistance steering system, such as an intelligent hydraulic-assistance recirculating-ball steering gear assembly (iRCB) without an oil pressure sensor and to verify that hydraulic components thereof are working normally.

Figure 1:
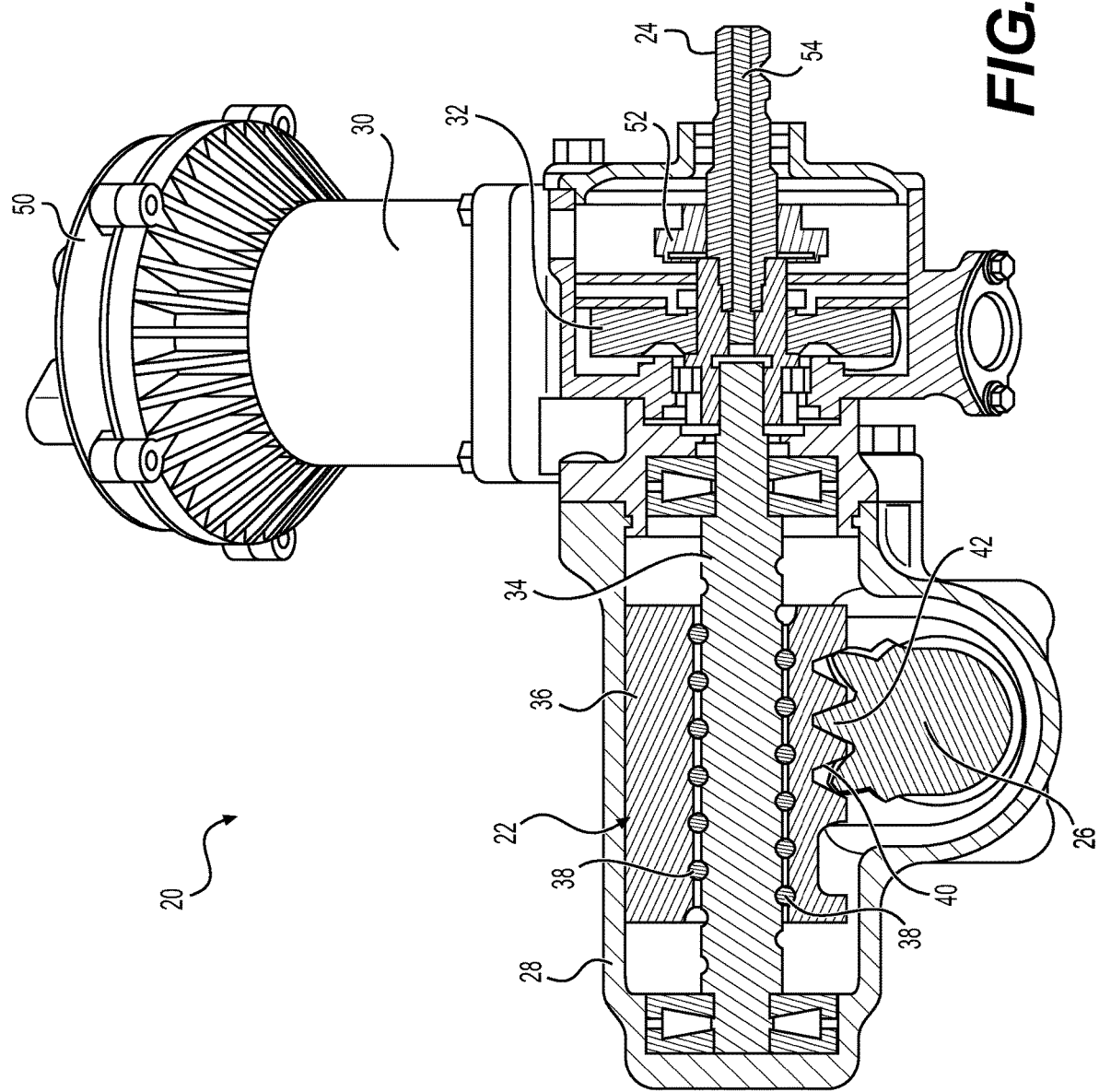
FIG. 1 shows a partial cut-away view of a first electronically-controlled hydraulic-assistance recirculating-ball steering gear assembly.

FIG. 1 shows a partial cut-away view of a first electronically-controlled hydraulic-assistance recirculating-ball steering gear assembly (iRCB) 20. The first iRCB 20 includes a first hydraulically-assisted recirculating ball screw (RCB) mechanism 22 configured to provide a mechanical torque advantage to rotation of a first input shaft 24 for connection to a handwheel (not shown in the FIGS) in order to drive a first output shaft 26 for moving one or more road wheels (not shown) for steering a vehicle. The first iRCB 20 includes a first housing 28 coupled to a first electric motor 30. The first electric motor 30 drives a first gear set 32 to cause a first leadscrew 34 to rotate. The rotation of the first leadscrew 34 causes a first ballscrew nut 36 to translate linearly. The first ballscrew nut 36 has a generally tubular shape and is disposed annularly about the first leadscrew 34 with a plurality of ball bearings 38 disposed therebetween and riding in a corresponding grooves in the first leadscrew 34. The interaction of the first leadscrew 34 with the first ballscrew nut 36 via the ball bearings 38 causes the first ballscrew nut 36 to translate in an axial direction in response to rotation of the first leadscrew 34. The first ballscrew nut 36 also defines an external thread 40 that engages one or more teeth 42 of the first output shaft 26 to cause the first output shaft 26 to rotate as the first ballscrew nut 36 translates along the first leadscrew 34.

The first iRCB 20 may include a hydraulic assistance to provide an additional force on the first ballscrew nut 36, and thereby increasing the torque supplied to the first output shaft 26.

Still referring to FIG. 1, a first electronic control unit (ECU) 50 is mounted on an end of the first electric motor 30 and configured to supply power to the first electric motor 30 for controlling the first iRCB 20. A first torque and angle sensor (TAS) 52 is coupled to the first input shaft 24 and configured to measure an angular position of the first input shaft 24 and an angular position of the first leadscrew 34, and thus the angular position of the first output shaft 26. The first TAS 52 can, therefore, be used to determine an amount of torque applied to the first input shaft 24 based on a difference between the angular positions of the first input shaft 24 and the first leadscrew 34, which may result from a twisting of a torsion bar 54 having opposite ends connected to each of the first input shaft 24 and the first leadscrew 34.

Figure 2:
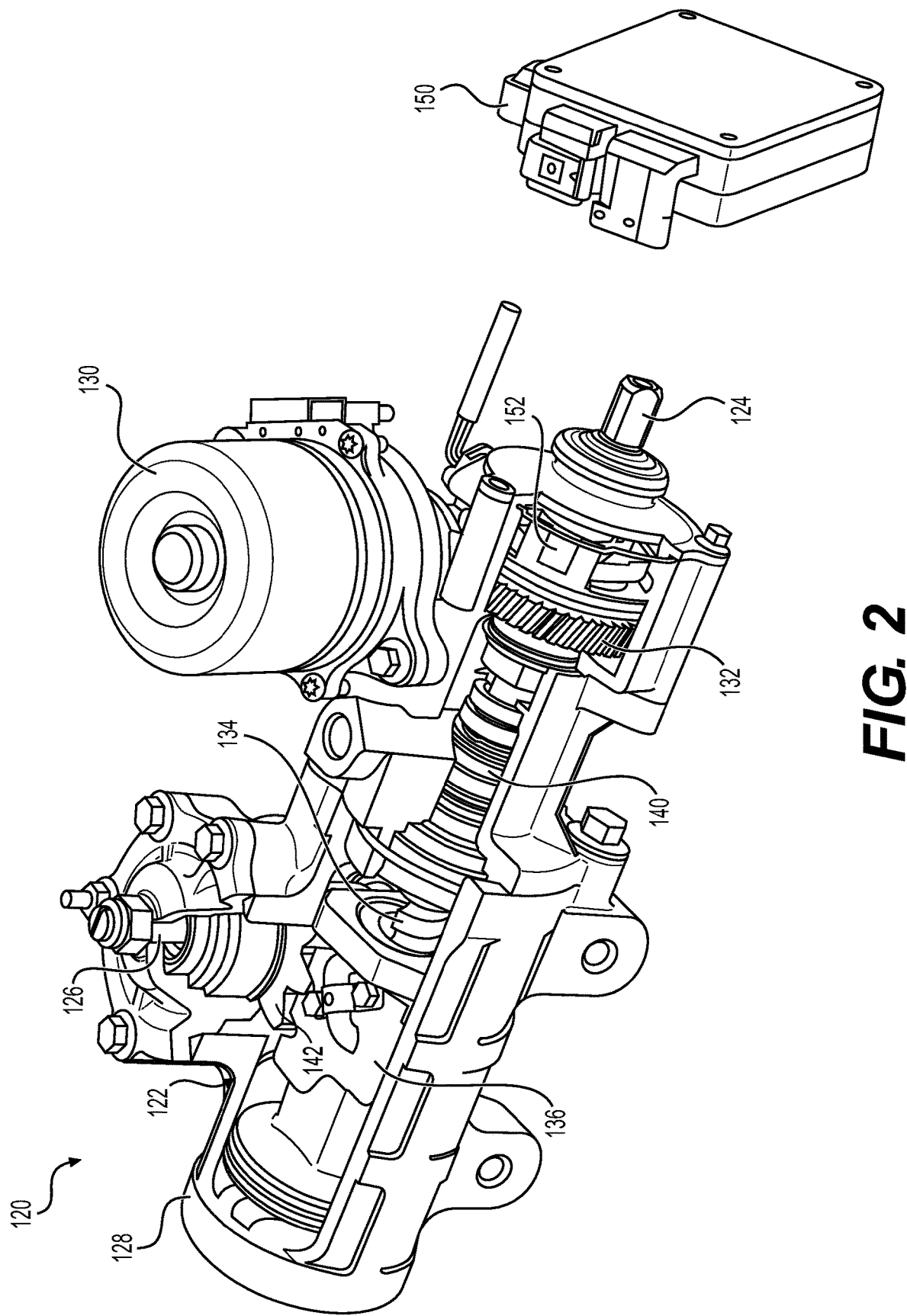
FIG. 2 shows a partial cut-away perspective view of a second electronically-controlled hydraulic-assistance recirculating-ball steering gear assembly.

FIG. 2 shows a partial cut-away perspective view of a second iRCB 120. The second iRCB 120 may be similar to the first iRCB 20. The second iRCB 120 includes a second hydraulically-assisted recirculating ball screw (RCB) mechanism 122 configured to provide a mechanical torque advantage to rotation of a second input shaft 124 for connection to a handwheel (not shown in the FIGS) in order to drive a second output shaft 126 for moving one or more road wheels (not shown) for steering a vehicle. The second iRCB 120 includes a second housing 128 coupled to a second electric motor 130. The second electric motor 130 drives a second gear set 132 to cause a second leadscrew 134 to rotate. The rotation of the second leadscrew 134 causes a second ballscrew nut 136 to translate linearly. The second ballscrew nut 136 has a generally tubular shape and is disposed annularly about the second leadscrew 134 with a plurality of ball bearings (not shown) disposed therebetween and riding in a corresponding grooves in the second leadscrew 134. The interaction of the second leadscrew 134 with the second ballscrew nut 136 causes the second ballscrew nut 136 to translate in an axial direction in response to rotation of the second leadscrew 134. The second ballscrew nut 136 engages one or more second teeth 142 of the second output shaft 126 to cause the second output shaft 126 to rotate as the second ballscrew nut 136 translates along the second leadscrew 134.

The second iRCB 120 may include a hydraulic assistance to provide an additional force on the second ballscrew nut 136, and thereby increasing the torque supplied to the second output shaft 126. A hydraulic control valve 140 may selectively control flow of hydraulic fluid to control force applied to the second ballscrew nut 136.

Still referring to FIG. 2, a second electronic control unit (ECU) 150 is located remotely from the second RCB mechanism 122. The second ECU 150 is configured to supply power to the second electric motor 130 for controlling the second iRCB 120. A second TAS 152 is coupled to the second input shaft 124 and configured to measure an angular position of the second input shaft 124 and an angular position of the second leadscrew 134. The second TAS 152 can, therefore, be used to determine an amount of torque applied to the second input shaft 124. The second TAS 152 may be in functional communication with the second ECU 150 for communicating the angle of one or more of the angular position of the second input shaft 124 and the angular position of the second leadscrew 134, indicating an angular position of the second output shaft 126.

Figure 3:
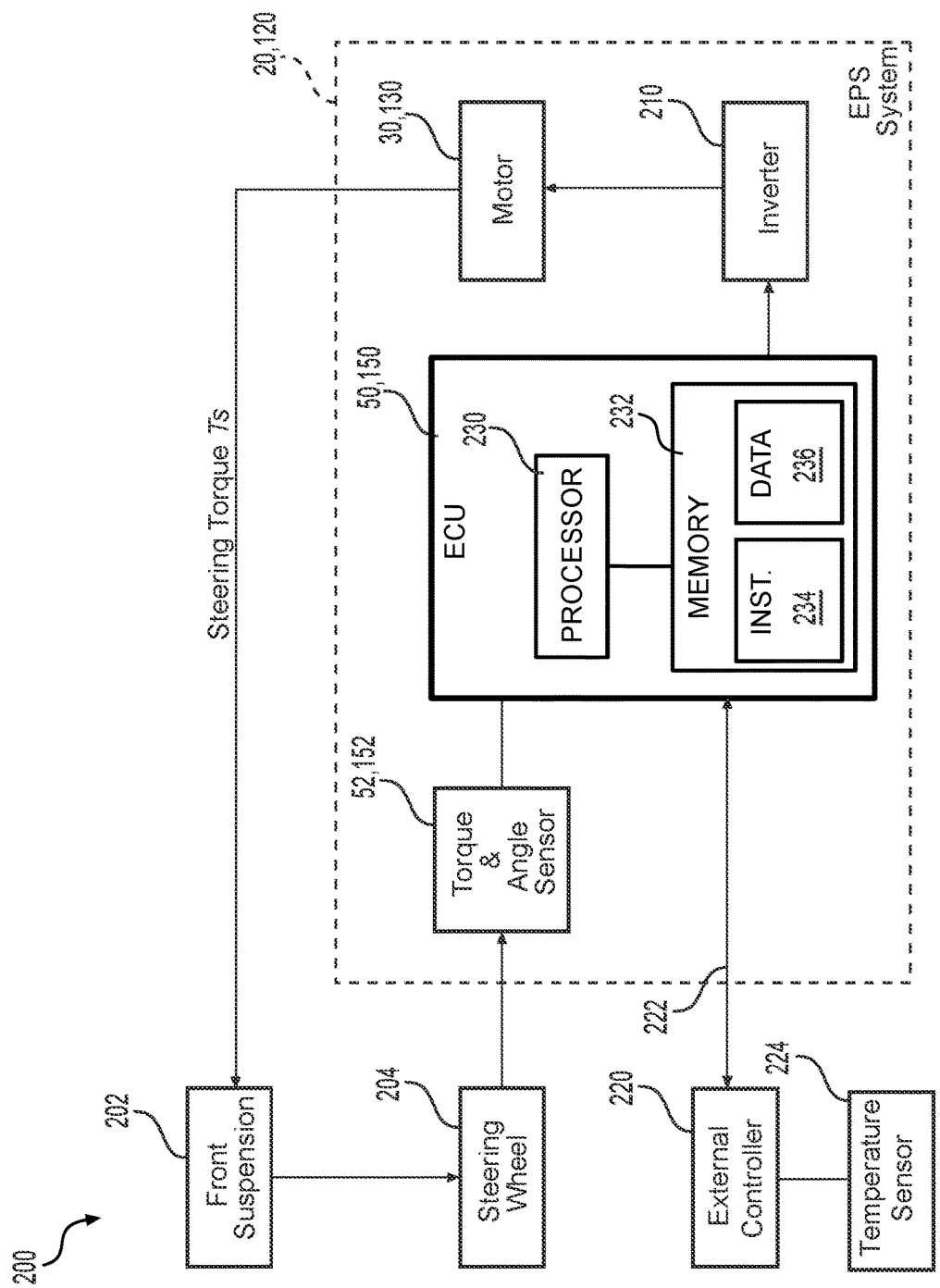
FIG. 3 shows a schematic block diagram of a system to detect and characterize a malfunction in an electronically-controlled hydraulic-assistance steering system for a vehicle, in accordance with the present disclosure.

FIG. 3 shows a schematic block diagram of a system 200 to detect and characterize a malfunction in an electronically-controlled hydraulic-assistance steering system for a vehicle. The system 200 includes an electric power steering (EPS) assembly 20, 120, such as the first iRCB 20 or the second iRCB 120, that applies a steering torque Ts to a front suspension 202 for steering a vehicle. The system 200 also includes a steering wheel 204, which may also be called a handwheel, for controlling the steering of the vehicle.

FIG. 3 shows EPS assembly 20, 120 including an ECU 50, 150, which may also be called a controller. The EPS assembly 20, 120 also includes an inverter 210 configured to supply power to the electric motor 30, 130 to provide the steering torque Ts to the front suspension 202. The ECU 50, 150 may thereby control operation of the electric motor 30, 130. For example, the ECU 50, 150 may generate gate driver signals for controlling conduction of one or more switches in the inverter 210 to control torque and speed of the electric motor 30, 130.

As shown in FIG. 3, the ECU 50, 150 receives one or more signals from the TAS 52, 152 indicating the angular positions of the input shaft 24, 124 and the output shaft 26, 126, as well as the torque applied to the input shaft 24, 124. The ECU 50, 150 also receives one or more signals from the temperature sensor 218. Additionally, the ECU 50, 150 is in communication with one or more external controllers 220 via a communications bus 222, such as a controller area network (CAN) bus. The external controllers 220 may include, for example, a body control module (BCM) and/or a powertrain control module (PCM) for communicating signals, such as vehicle speed, to the ECU 50, 150 of the system 200. A temperature sensor 224 is connected to one of the external controllers 220 and measures a temperature of hydraulic fluid within the EPS assembly 20, 120. The external controller 220 may communicate data regarding the temperature of the hydraulic fluid to the ECU 50, 150. Alternatively or additionally, the EPS assembly 20, 120 may receive data regarding the temperature from a sensor that is connected directly to the ECU 50, 150.

The ECU 50, 150 includes a processor 230 coupled to a storage memory 232. The storage memory 232 includes instruction storage 234 storing instructions, such as program code for execution by the processor 230. The storage memory 232 also includes data storage 236 for holding data for use by the processor 230. The data storage 236 may record, for example, values of the parameters measured by one or more sensors, such as the temperature sensor 218, and the TAS 52, 152, values received from one or more external controllers 220, and/or the outcome of functions calculated by the processor 230.

Design Approach

Normally, for most vehicle speed and steering wheel speed, the driver's hand torque will not exceed a certain threshold value (e.g. less than 6 Nm). This values may fluctuate according to road conditions. However, this value does not vary widely. When there is a hydraulic system malfunction that prevents the hydraulic system from providing assistance, the driver will require a lot of additional effort (over 10 Nm) to manipulate the steering wheel, and the torque sensor, such as the TAS 52, 152, will measure such abnormal torque values.

Figure 4:
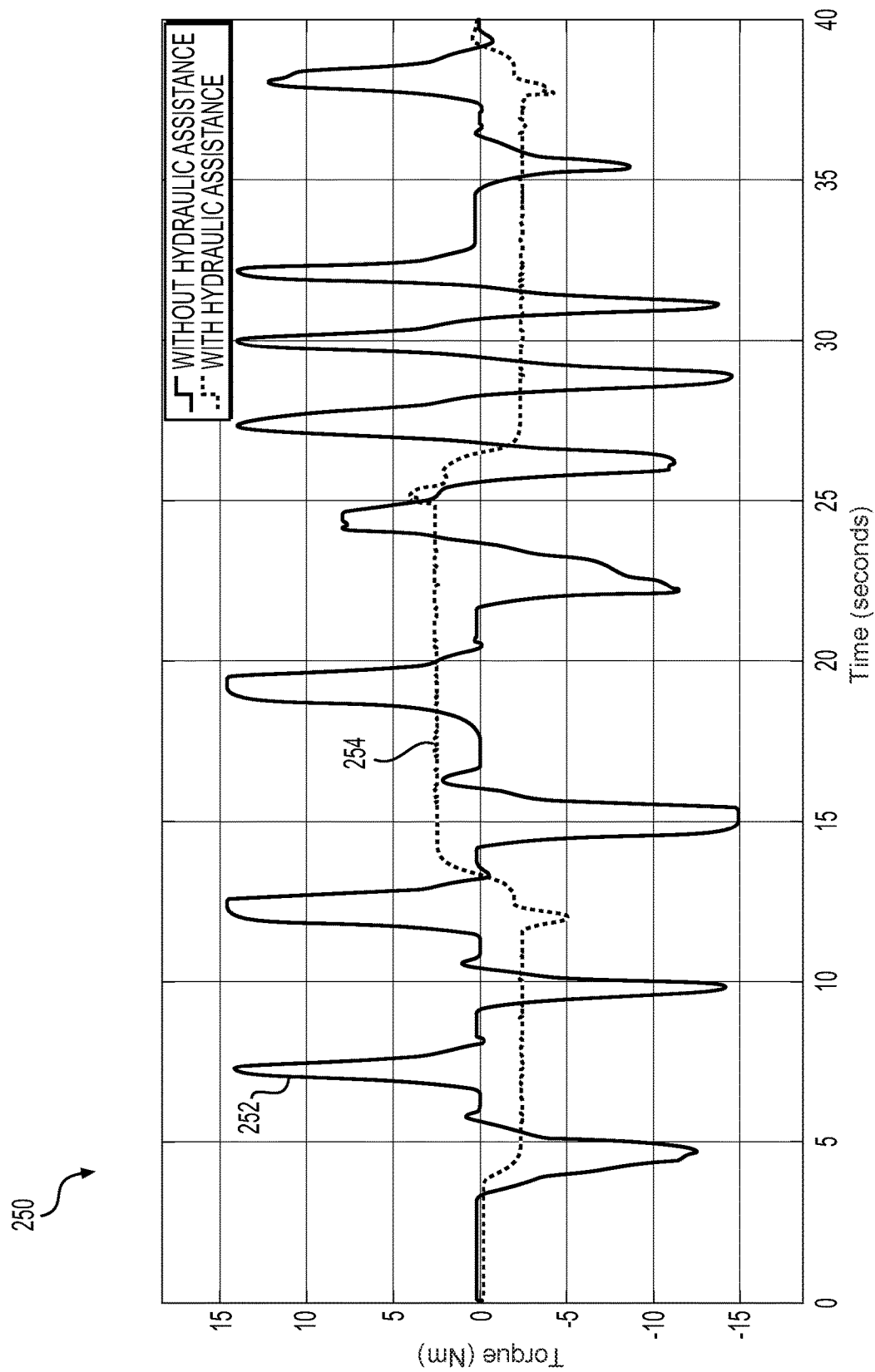
FIG. 4 shows a graph with plots showing hand torque over time in a steering system with and without hydraulic assistance.

FIG. 4 shows a graph 250 including a first plot 252 showing hand torque (i.e. torque on the steering wheel) over time in a steering system without hydraulic assistance, and a second plot 254 showing hand torque of the steering wheel over time in a steering system without hydraulic assistance. As shown on FIG. 4, the hand torque in the steering system without hydraulic assistance has significantly higher values than the hand torque in the steering system with hydraulic assistance (+/− about 14 Newton-meters vs +/− about 4 Newton-meters).

Figure 5:
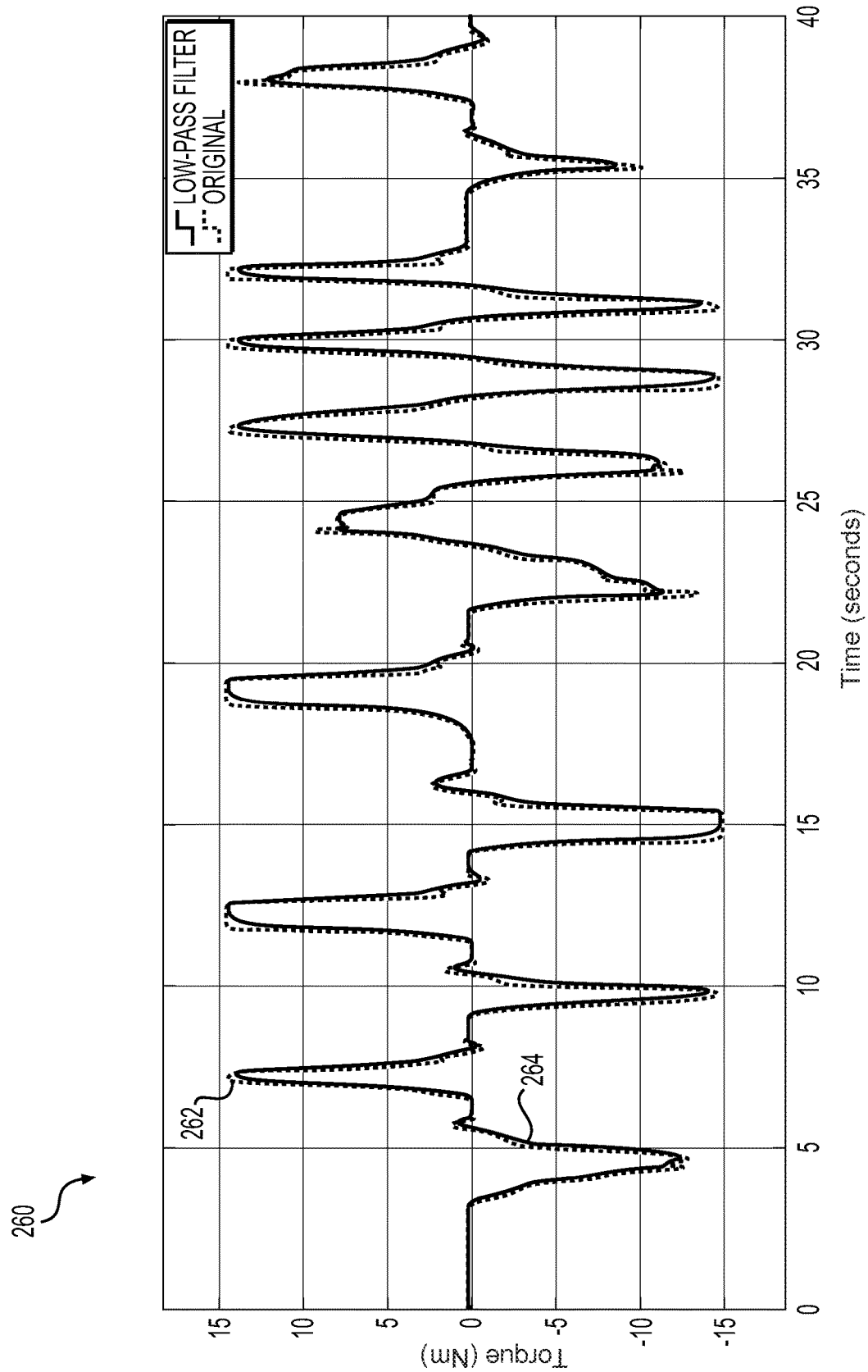
FIG. 5 shows a graph with plots showing hand torque over time in a steering system without hydraulic assistance, with and without application of a low-pass filter.

FIG. 5 shows a graph 260 including a third plot 262 showing hand torque (i.e. torque on the steering wheel) directly measured by a torque sensor, and a fourth plot 264 showing a filtered hand torque based on the measured torque, and with application of a low-pass filter. As shown on FIG. 5, the filtered torque illustrated in the fourth plot 264 is smoother and with a delay in rapidly changing value.

The low-pass filter may include a $1^{st}$ order low-pass filter, which may be represented as Y(n), described in equations (1)-(3), below:

$$Y(n) = \frac{X(n) + \frac{a}{Ts} * Y(n-1)}{1 + \frac{a}{Ts}} \quad (1)$$

$$f_{cut-off} = \frac{1}{2\pi a} \quad (2)$$

$$a = \frac{1}{2\pi f_{cut-off}} \quad (3)$$

where n is an integer number of a sample, Ts is the sample time, a is a constant, and $f_{cut-off}$ is a cutoff frequency.

Figure 6:
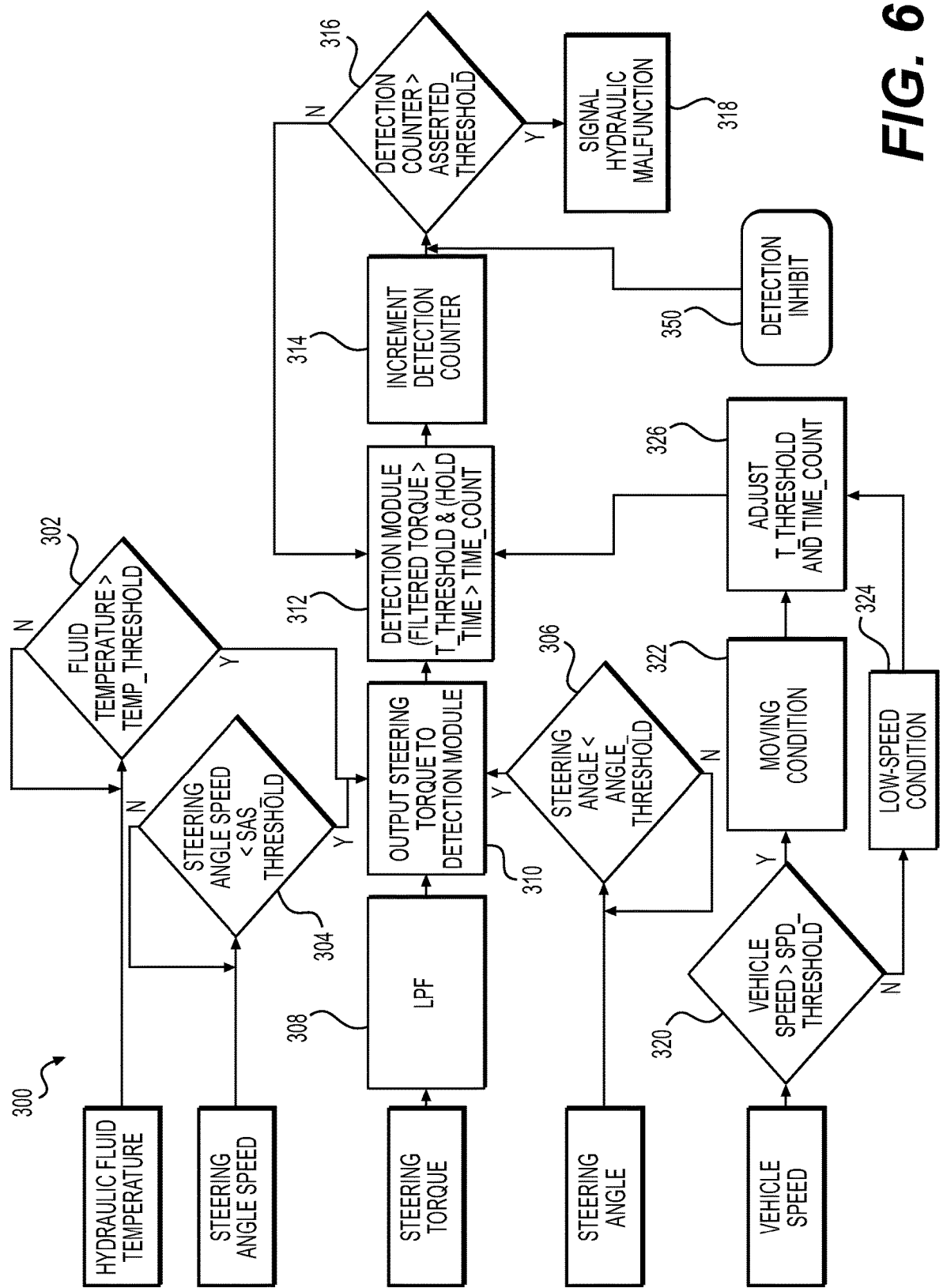
FIG. 6 shows a flow diagram illustrating a first method for detecting a malfunction in an electronically-controlled hydraulic-assistance steering system, in accordance with the present disclosure.

FIG. 6 shows a flow diagram illustrating a first method 300 for detecting a malfunction in an electronically-controlled hydraulic-assistance steering system, such as the EPS assembly 20, 120. One or more steps of the first method 300 can be performed by the ECU 50, 150, in accordance with some embodiments of the present disclosure. As can be appreciated in light of the disclosure, the order of operation within the method is not limited to the sequential execution as illustrated in FIG. 6, but may be performed in one or more varying orders as applicable and in accordance with the present disclosure.

The first method 300 includes comparing, at 302, a temperature in the hydraulic-assisted steering system with a fluid temperature threshold value, labeled TEMP_THRESHOLD. The temperature in the hydraulic-assisted steering system may be determined by the temperature sensor 218 and may represent a temperature of hydraulic fluid in the EPS assembly 20, 120. Step 302 may include determining the temperature in the hydraulic-assisted steering system being greater than the fluid temperature threshold value TEMP_THRESHOLD.

The first method 300 also includes comparing, at 304, a steering angle speed with an angular speed threshold value, labeled SAS_THRESHOLD. The steering angle speed may represent an angular speed of the input shaft 24, 124. The steering angle speed may be measured or otherwise determined based on one or more measurements by a sensor, such as the TAS 52, 152. Step 304 may include determining the steering angle speed being less than the angular speed threshold value SAS_THRESHOLD.

The first method 300 also includes comparing, at 306, a steering angular position, also called "steering angle", with an angular position threshold value, labeled ANGLE_THRESHOLD. The steering angular position may be measured or otherwise determined based on one or more measurements by a sensor, such as the TAS 52, 152. Step 306 may include determining the steering angular position being less than the angular position threshold value ANGLE_THRESHOLD.

The first method 300 also includes filtering, at 308, a steering torque, using a low-pass filter (LPF). The steering torque may be measured or otherwise determined based on one or more measurements by a sensor, such as the TAS 52, 152. The first method 300 also includes selectively outputting, at 310, the filtered steering torque produced by the filtering at step 308 and in response to one or more of the comparisons 302, 304, 306. In some embodiments, step 310 only outputs the filtered steering torque value in response to all of the comparisons 302, 304, 306 affirmatively determining the corresponding comparison, as indicated by the correspond yes (Y) output lines on FIG. 6. Step 310 may output another signal, such as a null value, in response to one or more of the comparisons 302, 304, 306 not affirmatively determining the corresponding comparison.

The first method 300 also includes comparing, at step 312, the filtered steering torque value to a torque threshold, labeled T_THRESHOLD. Step 312 may include determining the filtered steering torque value being greater than the torque threshold T_THRESHOLD. In some embodiments, step 312 may indicate the filtered steering torque value staying above than the torque threshold T_THRESHOLD for a period of time longer than a predetermined length of time, labeled TIME_COUNT, to avoid a false indication that may result from a short spike in the filtered steering torque value. Step 312 may use the filtered steering torque value from step 310 (i.e. it may only determine a positive indication of the filtered steering torque value being greater than the torque threshold T_THRESHOLD if step 310 outputs the filtered steering torque value).

The first method 300 also includes incrementing, at step 314, a detection counter in response to step 312 determining the filtered steering torque value being greater than the torque threshold T_THRESHOLD for longer than the predetermined length of time TIME_COUNT. The first method 300 also includes determining, at 316, the detection counter being greater than an assertion threshold, labeled ASSERTED_THRESHOLD. Step 316 may, thereby indicate the steering torque exceeding the torque threshold T_THRESHOLD for the predetermined length of time TIME_COUNT and more than the assertion threshold ASSERTED_THRESHOLD number of times.

The first method 300 also includes signaling, at 318, a malfunction in an electronically-controlled hydraulic-assistance steering system. Step 318 may include generating a malfunction signal in response to the determining the steering torque exceeding the threshold torque for the predetermined length of time TIME_COUNT, and more than the assertion threshold ASSERTED_THRESHOLD number of times, such as in response to step 316 indicating an affirmative to determining the detection counter exceeding the assertion threshold ASSERTED_THRESHOLD number of times.

The first method 300 also includes comparing, at 320, a vehicle speed with a speed threshold value, labeled SPD_THRESHOLD. The vehicle speed may be communicated to the ECU 50, 150 from an external controller 220. Alternatively, the ECU 50, 150 may directly determine the vehicle speed based on a signal from one or more sensors. Step 320 may include determining the vehicle speed being greater than the speed threshold value SPD_THRESHOLD. The first method 300 includes indicating, at 322, the vehicle having a moving condition in response to step 320 determining the vehicle speed being greater than the speed threshold value SPD_THRESHOLD. The first method 300 also includes indicating, at 324, the vehicle having a low-speed condition in response to step 320 determining the vehicle speed being not greater than the speed threshold value SPD_THRESHOLD. The first method 300 further includes adjusting, at 326, one or more of the torque threshold T_THRESHOLD and/or the predetermined length of time TIME_COUNT based on the corresponding speed condition of the vehicle as indicated at 322 or 324.

The first method 300 also includes detection inhibit module 350 configured to selectively inhibit detection of a malfunction in the electronically-controlled hydraulic-assistance steering system, based on one or more conditions. The detection inhibit module 350 is described in more detail on FIG. 7.

Figure 7:
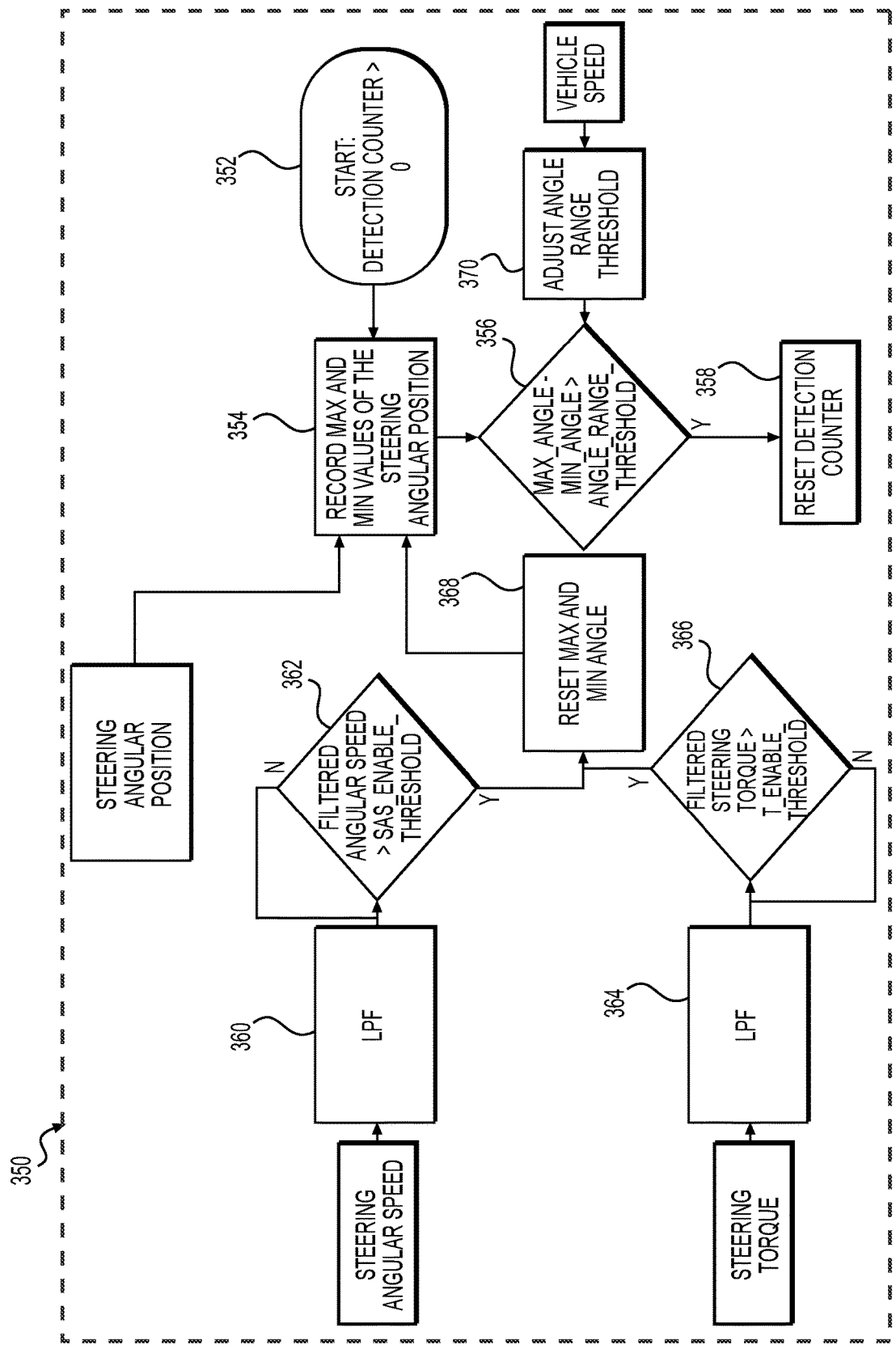
FIG. 7 shows a flow diagram illustrating a detection inhibit module for preventing malfunction misjudgment and for performing resuming malfunction detection when resuming operation of the electronically-controlled hydraulic-assistance steering system, in accordance with the present disclosure.

FIG. 7 shows a flow diagram illustrating details of the detection inhibit module 350. The detection inhibit module 350 may function to prevent misjudgment of a malfunction and/or to facilitate resuming malfunction detection when resuming operation of the electronically-controlled hydraulic-assistance steering system. The detection inhibit module 350 starts at 352 in response to the detection counter having a value greater than zero. In other words, the detection inhibit module 350 may be invoked by the first method 300 in response to the detection counter being incremented at step 314 and in response to step 312 determining the filtered steering torque value being greater than the torque threshold T_THRESHOLD for longer than the predetermined length of time TIME_COUNT.

The detection inhibit module 350 also includes recording, at 354, maximum (max) and minimum (min) values of the steering angular position, also called "steering angle". For example, the processor 230 may execute instructions to compare a current value of the steering angular position to recorded minimum and maximum values. The processor 230 may also replace the recorded minimum steering angle value, also called MIN_ANGLE, with the current value of the steering angular position if the current value of the steering angular position is less than the recorded minimum value. For example, the processor 230 may store, in the data storage 236, a value representing the current value of the steering angular position in a memory location associated with the minimum steering angle value MIN_ANGLE. The processor 230 may also replace the recorded maximum minimum steering angle value, also called MAX_ANGLE, with the current value of the steering angular position if the current value of the steering angular position is greater than the recorded maximum steering angle value MAX_ANGLE. For example, the processor 230 may store, in the data storage 236, a value representing the current value of the steering angular position in a memory location associated with the maximum steering angle value MAX_ANGLE.

The detection inhibit module 350 also includes comparing, at 356, a steering angle range with an angle range threshold value, labeled ANGLE_RANGE_THRESHOLD, and where the steering angle range represents a difference between the recorded maximum steering angle value MAX_ANGLE, and the recorded minimum steering angle value MIN_ANGLE. Step 356 may include determining the steering angle range being greater than the angle range threshold value ANGLE_RANGE_THRESHOLD The detection inhibit module 350 also includes resetting, at 358, the detection counter in response to determining, at step 356, the steering angle range being greater than the angle range threshold value ANGLE_RANGE_THRESHOLD. Resetting the detection counter may have the effect of preventing the detection counter being greater than the assertion threshold ASSERTED_THRESHOLD at 316, and thereby selectively inhibiting generating the malfunction signal in response to the comparing the steering angle range to the angle range threshold value performed at step 356.

The detection inhibit module 350 also includes filtering, at 360, a steering angular speed signal using a low-pass filter (LPF) and to generate a filtered steering angle speed signal. The steering angular speed may represent an angular speed of the input shaft 24, 124. The steering angular speed may be measured or otherwise determined based on one or more measurements by a sensor, such as the TAS 52, 152.

The detection inhibit module 350 also includes comparing, at 362, the filtered steering angular speed with a steering angular speed enable threshold value, labeled SAS_ENABLE_THRESHOLD. Step 362 may include determining the filtered steering angular speed being greater than the steering angular speed enable threshold value SAS_ENABLE_THRESHOLD.

The detection inhibit module 350 includes filtering, at 364, a steering torque signal using a low-pass filter (LPF) and to generate a filtered steering torque signal. The steering torque may be measured or otherwise determined based on one or more measurements by a sensor, such as the TAS 52, 152.

The detection inhibit module 350 also includes comparing, at 366, the filtered steering torque signal with a steering torque enable threshold value, labeled T_ENABLE_THRESHOLD. Step 366 may include determining the filtered steering torque being greater than the steering torque enable threshold value T_ENABLE_THRESHOLD.

The detection inhibit module 350 also includes resetting, at 368, the recorded minimum angular position value MIN_ANGLE and the recorded maximum angular position value MAX_ANGLE and in response to one or more of: determining, at step 362, the filtered steering angular speed being greater than the steering angular speed enable threshold value SAS_ENABLE_THRESHOLD, and/or determining, at step 366, the filtered steering torque being greater than the steering torque enable threshold value T_ENABLE_THRESHOLD In some embodiments, an affirmative determination at step 362 or an affirmative determination at step 355 may cause the recorded minimum angular position value MIN_ANGLE and the recorded maximum angular position value MAX_ANGLE to be reset at step 368. The affirmative determinations may be denoted as "Y" in the flow chart of FIG. 7. Step 368 may include setting each of the recorded minimum angular position value MIN_ANGLE and the recorded maximum angular position value MAX_ANGLE equal to a current value of the steering angular position.

The detection inhibit module 350 also includes adjusting, at 370, the angle range threshold value ANGLE_RANGE_THRESHOLD based on a vehicle speed of the vehicle. For example, a relatively high vehicle speed may cause a lower value of the angle range threshold value ANGLE_RANGE_THRESHOLD to be used. Step 370 may calculate the angle range threshold based on the vehicle speed. Alternatively, step 370 may employ another technique, such as selecting one or more predetermined values for the angle range threshold value ANGLE_RANGE_TH-RESHOLD based on the vehicle speed.

Figure 8:
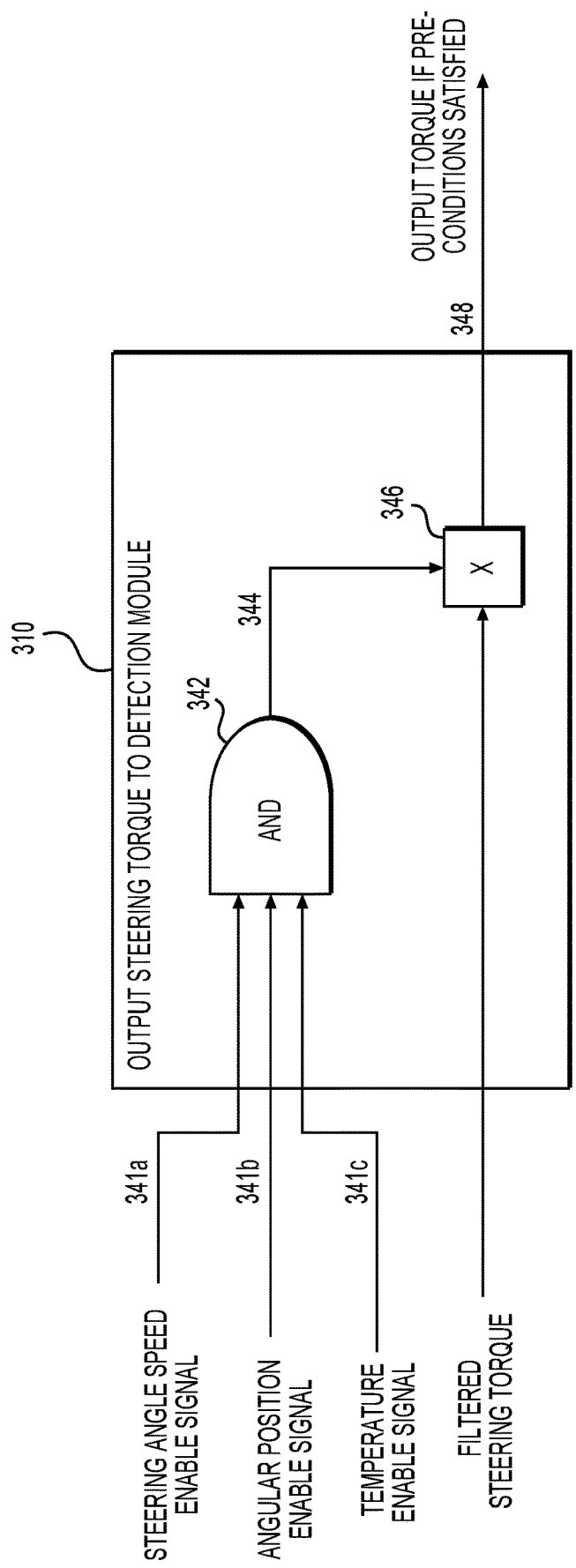
FIG. 8 shows a schematic block diagram of an output steering torque to detection module for implementing a portion of the method of FIG. 6.

FIG. 8 shows a schematic block diagram of the detection inhibit module 310. The detection inhibit module 310 takes three enable signals 341*a*, 341*b*, 341*c*, as inputs. The enable signals 341*a*, 341*b*, 341*c* may each have Boolean values. The enable signals 341*a*, 341*b*, 341*c* include a steering angle speed enable signal 341*a*, which may be asserted at step 304 in response to determining the steering angle speed being less than the angular speed threshold value SAS_THRESH-OLD. The enable signals 341*a*, 341*b*, 341*c* also include an angular position enable signal 341*b*, which may be asserted at step 306 in response to determining the steering angular position being less than the angular position threshold value ANGLE_THRESHOLD. The enable signals 341*a*, 341*b*, 341*c* also include a temperature enable signal 341*c*, which may be asserted at step 302 in response to determining the temperature in the hydraulic-assisted steering system being greater than the fluid temperature threshold value TEMP_THRESHOLD.

The detection inhibit module 310 includes an AND gate 342 configured to selectively assert a precondition signal 344 with all three enable signals 341*a*, 341*b*, 341*c* being asserted, and to de-assert the precondition signal 344 if any of the three enable signals 341*a*, 341*b*, 341*c* are de-asserted. The detection inhibit module 310 also includes a multiplier 346 configured multiply the filtered steering torque, which may be produced by a low-pass filter at step 308, by the precondition signal 344 and to generate an output torque signal 348. The multiplier 346, therefore functions to set the output torque signal 348 equal to the filtered steering torque if the precondition signal 344 is asserted, and to set the output torque signal 348 equal to zero if the precondition signal 344 is de-asserted.

Error Resumption and Malfunction Diagnostic

Each time the vehicle is restarted, the hydraulic malfunction signal may have a corresponding diagnostic trouble code (DTC) that is set from "active" to "History". In other words, the DTC may be recorded as a historical error and no longer as an active DTC.

During a same ignition cycle, the hydraulic malfunction signal may be resumed or re-asserted based on satisfying each of: the steering wheel angle varying by more than a certain amount (i.e. the angle range threshold value ANGLE_RANGE_THRESHOLD), the steering wheel torque remaining below a predetermined torque threshold (i.e. the steering torque enable threshold value T_ENABLE_THRESHOLD), and the steering angle speed remaining below a steering angular speed enable threshold value SAS_ENABLE_THRESHOLD. The three conditions may be determined by, steps 356, 366, and 362, respectively.

Figure 9B:
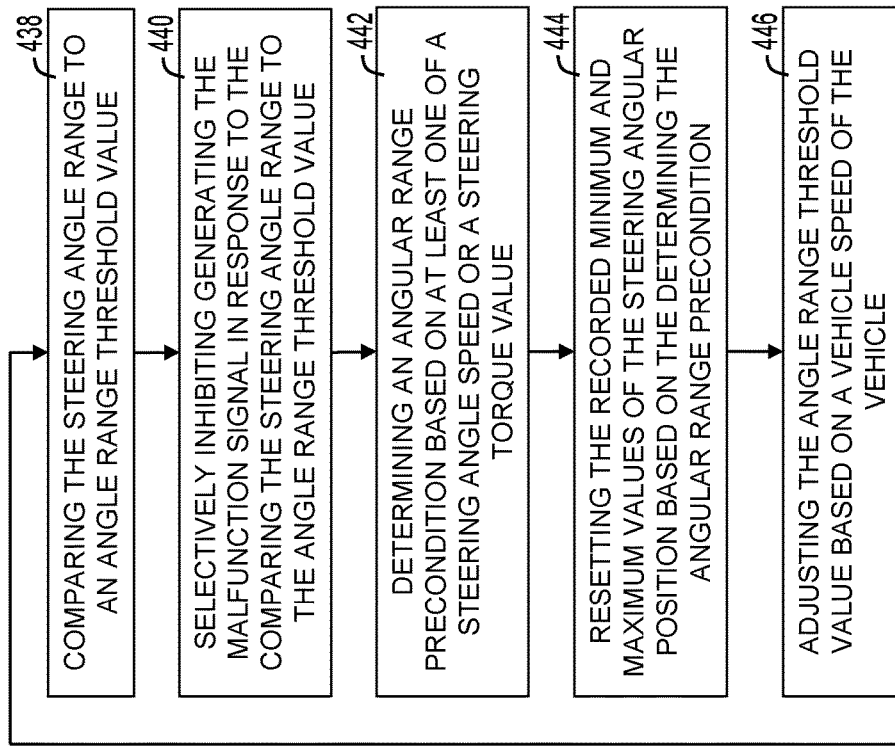
Figure 9B:
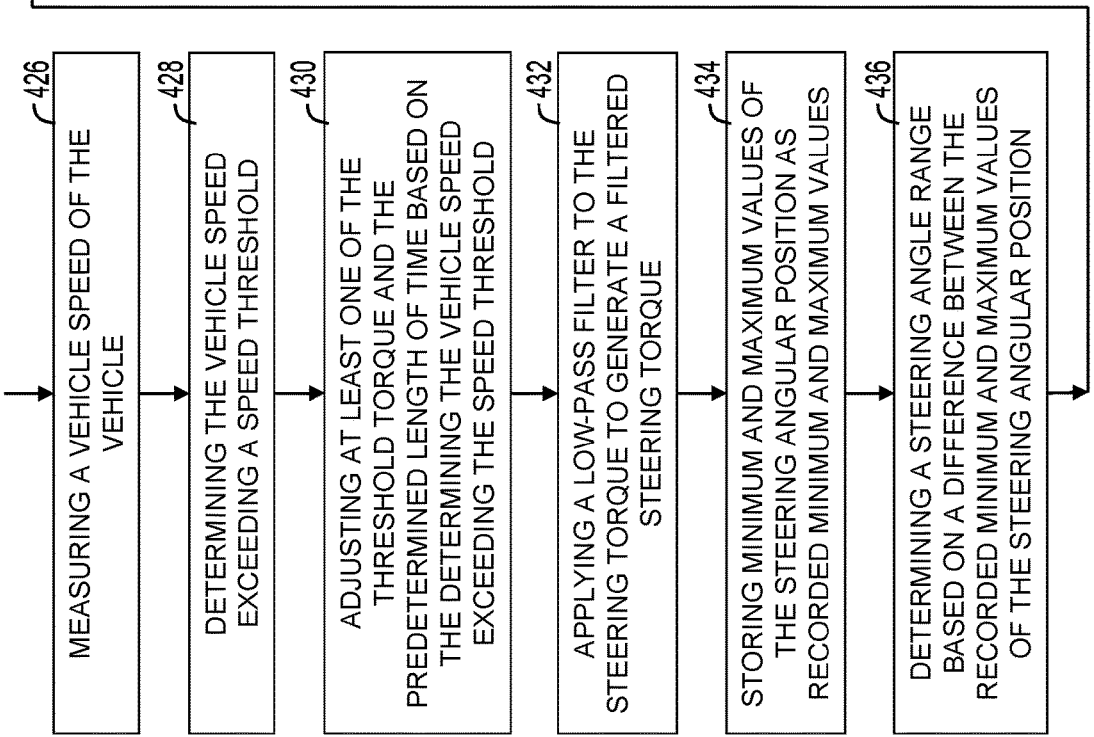

FIGS. 9A-9B show a flow diagram illustrating steps in second method 400 for detecting a malfunction in a hydraulic-assisted steering system for a vehicle. One or more steps of the second method 400 can be performed by the ECU 50, 150, in accordance with some embodiments of the present disclosure. As can be appreciated in light of the disclosure, the order of operation within the method is not limited to the sequential execution as illustrated in FIGS. 9A-9B but may be performed in one or more varying orders as applicable and in accordance with the present disclosure.

The second method 400 includes measuring, at step 402, a steering torque. For example, the TAS 52, 152 may measure the steering torque and communicate a signal to the ECU 50, 150 indicating the steering torque.

The second method 400 also includes determining, at step 404, the steering torque exceeding a threshold torque for a predetermined length of time. For example, step 404 may include the processor 230 of the ECU 50, 150 executing instructions to perform steps 312, 314, and/or 316 of the first method 300.

The second method 400 also includes generating, at step 406, a malfunction signal in response to the determining the steering torque exceeding the threshold torque for the predetermined length of time. For example, the processor 230 of the ECU 50, 150 may execute instructions to perform step 318 of the first method 300.

In some embodiments, step 406 includes enunciating the malfunction signal to a driver of the vehicle. An audio, visual, and/or tactile signal may be produced by one to indicate the malfunction signal. In some embodiments, enunciating the malfunction signal at step 406 may include generating a vibration in a steering wheel that is perceptible to the driver of the vehicle.

The second method 400 also includes measuring, at step 408, a steering angular position of the hydraulic-assisted steering system. For example, the TAS 52, 152 may measure the steering angular position and communicate a signal to the ECU 50, 150 indicating the steering angular position.

The second method 400 also includes determining, at step 410, the steering angular position being less than an angular position threshold value. For example, the processor 230 of the ECU 50, 150 may execute instructions to perform step 306 of the first method 300.

The second method 400 also includes selectively enabling, at step 412, generating the malfunction signal in response to the determining the steering angular position being less than the angular position threshold value. For example, the processor 230 of the ECU 50, 150 may execute instructions to perform step 310 of the first method 300.

The second method 400 also includes determining, at step 414, a steering angle speed of the hydraulic-assisted steering system. For example, the processor 230 of the ECU 50, 150 may execute instructions to compute the steering angle speed based on a change in the steering angular position over a given period of time.

The second method 400 also includes determining, at step 416, the steering angle speed being less than an angular speed threshold value. For example, the processor 230 of the ECU 50, 150 may execute instructions to perform step 304 of the first method 300.

The second method 400 also includes selectively enabling, at step 418, generating the malfunction signal in response to the determining the steering angle speed being less than the angular speed threshold value. For example, the processor 230 of the ECU 50, 150 may execute instructions to perform steps 304 and 310 of the first method 300.

The second method 400 also includes measuring, at step 420, a temperature in the hydraulic-assisted steering system. For example the temperature sensor 218 may measure the temperature of hydraulic fluid within the EPS assembly 20, 120 and communicate one or more signals to the ECU 50, 150 representing the temperature.

The second method 400 also includes determining, at step 422, the temperature in the hydraulic-assisted steering system being greater than a fluid temperature threshold value.

For example, the processor 230 of the ECU 50, 150 may execute instructions to perform step 302 of the first method 300.

The second method 400 also includes selectively enabling, at step 424, generating the malfunction signal in response to the determining the temperature in the hydraulic-assisted steering system being greater than a fluid temperature threshold value. For example, the processor 230 of the ECU 50, 150 may execute instructions to perform steps 302 and 310 of the first method 300.

In some embodiments, selectively enabling generating the malfunction signal at steps 412, 418, and/or 424 may require each of: the temperature in the hydraulic-assisted steering system being greater than the fluid temperature threshold value, the steering angular position being less than the angular position threshold value, and the steering angle speed being less than the angular speed threshold value. For example, the processor 230 of the ECU 50, 150 may execute instructions to implement AND gate 342 and the multiplier 346 of detection inhibit module 310 to perform step 310 of the first method 300.

The second method 400 also includes measuring, at step 426, a vehicle speed of the vehicle. Step 406 may include measuring or otherwise determining the vehicle speed by or more sensors. The vehicle speed may be communicated to the ECU 50, 150 from an external controller 220. Alternatively, the ECU 50, 150 may directly determine the vehicle speed based on a signal from one or more sensors.

The second method 400 also includes determining, at step 428, the vehicle speed exceeding a speed threshold. For example, the processor 230 of the ECU 50, 150 may execute instructions to perform step 320 of the first method 300.

The second method 400 also includes adjusting, at step 430, at least one of the threshold torque and the predetermined length of time based on the determining the vehicle speed exceeding the speed threshold. In some embodiments, adjusting at least one of the threshold torque and the predetermined length of time includes adjusting both of the threshold torque and the predetermined length of time based on the determining the vehicle speed exceeding the speed threshold. For example, the processor 230 of the ECU 50, 150 may execute instructions to perform step 326 of the first method 300.

The second method 400 also includes applying, at step 432, a low-pass filter to the steering torque to generate a filtered steering torque. For example, the processor 230 of the ECU 50, 150 may execute instructions to perform step 308 of the first method 300. Determining the steering torque exceeding the threshold torque at step 404 may further include comparing the filtered steering torque (from step 432) to the threshold torque.

The second method 400 also includes storing, at step 434, minimum and maximum values of the steering angular position as recorded minimum and maximum values. For example, the processor 230 of the ECU 50, 150 may execute instructions to perform step 354 of the detection inhibit module 350.

The second method 400 also includes determining, at step 436, a steering angle range based on a difference between the recorded minimum and maximum values of the steering angular position. For example, the processor 230 of the ECU 50, 150 may execute instructions to perform step 356 of the detection inhibit module 350. Step 436 may calculating the steering angle range by subtract the recorded minimum steering angle value MIN_ANGLE from the recorded maximum steering angle value MAX_ANGLE to compute the steering angle range representing a difference between those two recorded values.

The second method 400 also includes comparing, at step 438, the steering angle range to an angle range threshold value. For example, the processor 230 of the ECU 50, 150 may execute instructions to perform step 356 of the detection inhibit module 350.

The second method 400 also includes selectively inhibiting, at step 440, generating the malfunction signal in response to the comparing the steering angle range to the angle range threshold value. For example, the processor 230 of the ECU 50, 150 may execute instructions to perform step 358 of the detection inhibit module 350, which resets the detection counter, and thereby selectively inhibits generating the malfunction signal.

The second method 400 also includes determining, at step 442, an angular range precondition based on at least one of a steering angle speed or a steering torque value. For example, the processor 230 of the ECU 50, 150 may execute instructions to perform either or both of step 362 and/or step 366 of the detection inhibit module 350.

The second method 400 also includes resetting, at step 444, the recorded minimum and maximum values of the steering angular position based on the determining the angular range precondition. For example, the processor 230 of the ECU 50, 150 may execute instructions to perform step 368 of the detection inhibit module 350.

The second method 400 also includes adjusting, at step 446, the angle range threshold value based on a vehicle speed of the vehicle. For example, the processor 230 of the ECU 50, 150 may execute instructions to perform step 370 of the detection inhibit module 350.

The methods of the present disclosure can be applied to any electronic control hydraulic steering assistance systems. The system and method of the present disclosure may not require any hydraulic pressure detection sensor.

The present disclosure provides a method which can detect hydraulic dysfunction based on torque sensor (or torque & angle sensor). The detection method includes but is not limited to using steering torque value directly, or using any function of the torque value as the input as the judgment basis.

The detection method of the present disclosure may also use one or more of the following factors as a basis for comprehensive judgment: Vehicle Speed, ECU condition, Steering wheel angular position, Steering wheel angular velocity, Vehicle tire position, and/or Steering wheel angular acceleration.

In some embodiments, a warning signal may be sent in response to determining a hydraulic malfunction in the steering system.

In some embodiments an abnormal frequency steering wheel vibration could be applied for directly warning the driver in response to determining a hydraulic malfunction in the steering system.

In some embodiments, the detection may be selectively inhibited to prevent misjudgment of a hydraulic malfunction. The misjudgment may be based on a steering wheel range of motion, steering wheel torque, vehicle speed, and steering wheel angular speed. To implement the prevention of misjudgment, a method, such as the detection inhibit module 350 shown on FIG. 7, may be implemented.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting a malfunction in a hydraulic-assisted steering system for a vehicle, comprising:
   measuring a steering torque;
   determining the steering torque exceeding a threshold torque for a predetermined length of time; and
   generating a malfunction signal in response to the determining the steering torque exceeding the threshold torque for the predetermined length of time;
   determining at least one of: a steering angular position of the hydraulic-assisted steering system, a steering angle speed of the hydraulic-assisted steering system, or a temperature in the hydraulic-assisted steering system;
   determining at least one of: the steering angular position being less than an angular position threshold value, the steering angle speed being less than an angular speed threshold value, or the temperature in the hydraulic-assisted steering system being greater than a fluid temperature threshold value; and
   selectively enabling generating the malfunction signal in response to the determining the at least one of: the steering angular position being less than the angular position threshold value, the steering angle speed being less than the angular speed threshold value, or the temperature in the hydraulic-assisted steering system being greater than the fluid temperature threshold value.

2. The method of claim 1, wherein:
   determining the at least one of: the steering angular position of the hydraulic-assisted steering system, the steering angle speed of the hydraulic-assisted steering system, or the temperature in the hydraulic-assisted steering system includes measuring the steering angular position of the hydraulic-assisted steering system;
   determining the at least one of: the steering angular position being less than the angular position threshold value, the steering angle speed being less than the angular speed threshold value, or the temperature in the hydraulic-assisted steering system being greater than the fluid temperature threshold value includes determining the steering angular position being less than the angular position threshold value; and
   selectively enabling generating the malfunction signal in response to the determining the at least one of: the steering angular position being less than the angular position threshold value, the steering angle speed being less than the angular speed threshold value, or the temperature in the hydraulic-assisted steering system being greater than the fluid temperature threshold value includes selectively enabling generating the malfunction signal in response to the determining the steering angular position being less than the angular position threshold value.

3. The method of claim 1, wherein:
   determining the at least one of: the steering angular position of the hydraulic-assisted steering system, the steering angle speed of the hydraulic-assisted steering system, or the temperature in the hydraulic-assisted steering system includes determining the steering angle speed of the hydraulic-assisted steering system;
   determining the at least one of: the steering angular position being less than the angular position threshold value, the steering angle speed being less than the angular speed threshold value, or the temperature in the hydraulic-assisted steering system being greater than the fluid temperature threshold value includes determining the steering angle speed being less than the angular speed threshold value; and
   selectively enabling generating the malfunction signal in response to the determining the at least one of: the steering angular position being less than the angular position threshold value, the steering angle speed being less than the angular speed threshold value, or the temperature in the hydraulic-assisted steering system being greater than the fluid temperature threshold value includes selectively enabling generating the malfunction signal in response to the determining the steering angle speed being less than the angular speed threshold value.

4. The method of claim 1, wherein:
   determining the at least one of: the steering angular position of the hydraulic-assisted steering system, the steering angle speed of the hydraulic-assisted steering system, or the temperature in the hydraulic-assisted steering system includes measuring the temperature in the hydraulic-assisted steering system; and determining the at least one of: the steering angular position being less than the angular position threshold value, the steering angle speed being less than the angular speed threshold value, or the temperature in the hydraulic-assisted steering system being greater than the fluid temperature threshold value includes determining the temperature in the hydraulic-assisted steering system being greater than the fluid temperature threshold value; and selectively enabling generating the malfunction signal in response to the determining the at least one of: the steering angular position being less than the angular position threshold value, the steering angle speed being less than the angular speed threshold value, or the temperature in the hydraulic-assisted steering system being greater than the fluid temperature threshold value includes selectively enabling generating the malfunction signal in response to the determining the temperature in the hydraulic-assisted steering system being greater than the fluid temperature threshold value.

5. The method of claim 1, further comprising:
measuring the temperature in the hydraulic-assisted steering system; and
determining the temperature in the hydraulic-assisted steering system being greater than the fluid temperature threshold value;
measuring the steering angular position of the hydraulic-assisted steering system;
determining the steering angular position being less than the angular position threshold value;
determining the steering angle speed of the hydraulic-assisted steering system;
determining the steering angle speed being less than the angular speed threshold value; and
selectively enabling generating the malfunction signal in response to each of: the temperature in the hydraulic-assisted steering system being greater than the fluid temperature threshold value, the steering angular position being less than the angular position threshold value, and the steering angle speed being less than the angular speed threshold value.

6. The method of claim 1, wherein generating the malfunction signal includes enunciating the malfunction signal to a driver of the vehicle.

7. The method of claim 6, wherein the enunciating the malfunction signal includes generating a vibration in a steering wheel that is perceptible to the driver of the vehicle.

8. The method of claim 1, further comprising applying a low-pass filter to the steering torque to generate a filtered steering torque, and
wherein the determining the steering torque exceeding the threshold torque includes comparing the filtered steering torque to the threshold torque.

9. A method for detecting a malfunction in a hydraulic-assisted steering system for a vehicle, comprising:
measuring a steering torque;
determining the steering torque exceeding a threshold torque for a predetermined length of time;
generating a malfunction signal in response to the determining the steering torque exceeding the threshold torque for the predetermined length of time;
measuring a vehicle speed of the vehicle;
determining the vehicle speed exceeding a speed threshold; and
adjusting at least one of the threshold torque and the predetermined length of time based on the determining the vehicle speed exceeding the speed threshold.

10. The method of claim 9, wherein the adjusting at least one of the threshold torque and the predetermined length of time includes adjusting both of the threshold torque and the predetermined length of time based on the determining the vehicle speed exceeding the speed threshold.

11. A method for detecting a malfunction in a hydraulic-assisted steering system for a vehicle, comprising:
measuring a steering torque;
determining the steering torque exceeding a threshold torque for a predetermined length of time;
generating a malfunction signal in response to the determining the steering torque exceeding the threshold torque for the predetermined length of time;
measuring a steering angular position of the hydraulic-assisted steering system;
storing minimum and maximum values of the steering angular position as recorded minimum and maximum values;
determining a steering angle range based on a difference between the recorded minimum and maximum values of the steering angular position;
comparing the steering angle range to an angle range threshold value; and
selectively inhibiting generating the malfunction signal in response to the comparing the steering angle range to the angle range threshold value.

12. The method of claim 11, further comprising:
determining an angular range precondition based on at least one of a steering angle speed or a steering torque value; and
resetting the recorded minimum and maximum values of the steering angular position based on the determining the angular range precondition.

13. The method of claim 11, further comprising adjusting the angle range threshold value based on a vehicle speed of the vehicle.

14. A system for detecting a malfunction in a hydraulic-assisted steering system for a vehicle, comprising:
a torque sensor configured to measure a steering torque; and
a controller configured to:
determine the steering torque exceeding a threshold torque for a predetermined length of time; and
generate a malfunction signal in response to determining the steering torque exceeding the threshold torque for the predetermined length of time;
determine at least one of: a steering angular position of the hydraulic-assisted steering system, a steering angle speed of the hydraulic-assisted steering system, or a temperature in the hydraulic-assisted steering system;
determine at least one of: the steering angular position being less than an angular position threshold value, the steering angle speed being less than an angular speed threshold value, or the temperature in the hydraulic-assisted steering system being greater than a fluid temperature threshold value; and
selectively enable generating the malfunction signal in response to the determining the at least one of: the steering angular position being less than the angular position threshold value, the steering angle speed being less than the angular speed threshold value, or the temperature in the hydraulic-assisted steering system being greater than the fluid temperature threshold value.

15. The system of claim 14, further comprising:
a steering angle sensor configured to measure the steering angular position of the hydraulic-assisted steering system; and
wherein the controller is further configured to:
  determine the steering angular position being less than the angular position threshold value; and
  selectively enable determining the steering torque exceeding the threshold torque for the predetermined length of time in response to the determining the steering angular position being less than the angular position threshold value.

16. The system of claim 14, further comprising:
a steering angle sensor configured to measure the steering angular position of the hydraulic-assisted steering system; and
wherein the controller is further configured to:
  determine a steering angle speed based on the steering angular position;
  determine the steering angle speed being less than the angular speed threshold value; and
  selectively enable determining the steering torque exceeding the threshold torque for the predetermined length of time in response to the determining the steering angle speed being less than the angular speed threshold value.

17. The system of claim 14, further comprising:
a temperature sensor configured to measure the temperature in the hydraulic-assisted steering system; and
wherein the controller is further configured to:
  determine the temperature in the hydraulic-assisted steering system being greater than the fluid temperature threshold value; and
  selectively enable the determining the steering torque exceeding the threshold torque for the predetermined length of time in response to the determining the temperature in the hydraulic-assisted steering system being greater than a fluid temperature threshold value.

18. The system of claim 14, further comprising:
a steering angle sensor configured to measure a steering angular position of the hydraulic-assisted steering system; and
wherein the controller is further configured to:
  store minimum and maximum values of the steering angular position as recorded minimum and maximum values;
  determine a steering angle range based on a difference between the recorded minimum and maximum values of the steering angular position;
  compare the steering angle range to an angle range threshold value; and
  selectively inhibit generating the malfunction signal in response to determining the steering angle range being greater than the angle range threshold value.

19. The system of claim 18, wherein the controller is further configured to adjust the angle range threshold value based on a vehicle speed of the vehicle.

20. A system for detecting a malfunction in a hydraulic-assisted steering system for a vehicle, comprising:
a torque sensor configured to measure a steering torque; and
a controller configured to:
  determine the steering torque exceeding a threshold torque for a predetermined length of time; and
  generate a malfunction signal in response to determining the steering torque exceeding the threshold torque for the predetermined length of time;
  determine a vehicle speed exceeding a speed threshold; and
  adjust at least one of the threshold torque and the predetermined length of time based on the determining the vehicle speed exceeding the speed threshold.

* * * * *